Aug. 21, 1928.

I. E. McCABE 1,681,421

THERMAL SAFETY DEVICE

Filed March 29, 1926

INVENTOR.
IRA E. McCABE.
BY *Langdon Moore*
ATTORNEYS.

Aug. 21, 1928.  
I. E. McCABE  
1,681,421  
THERMAL SAFETY DEVICE  
Filed March 29, 1926  7 Sheets-Sheet 3
Fig. 3
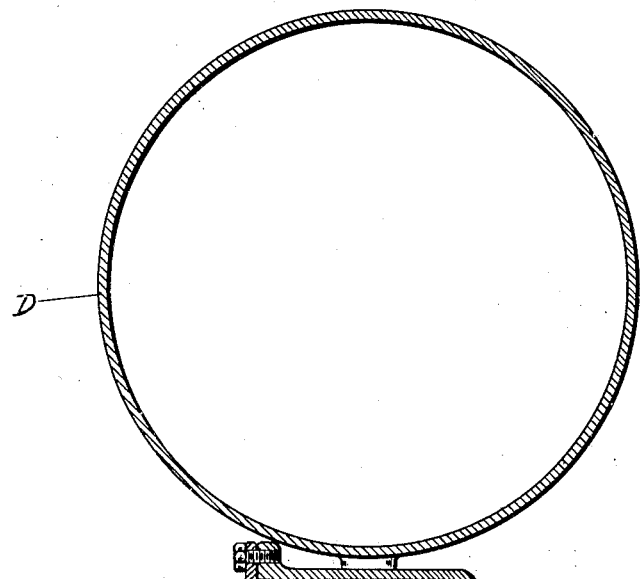
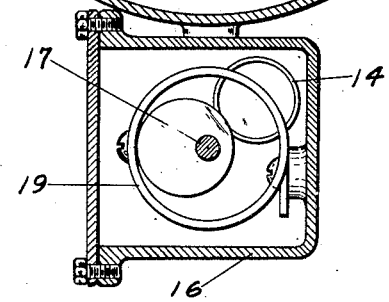
Fig. 4
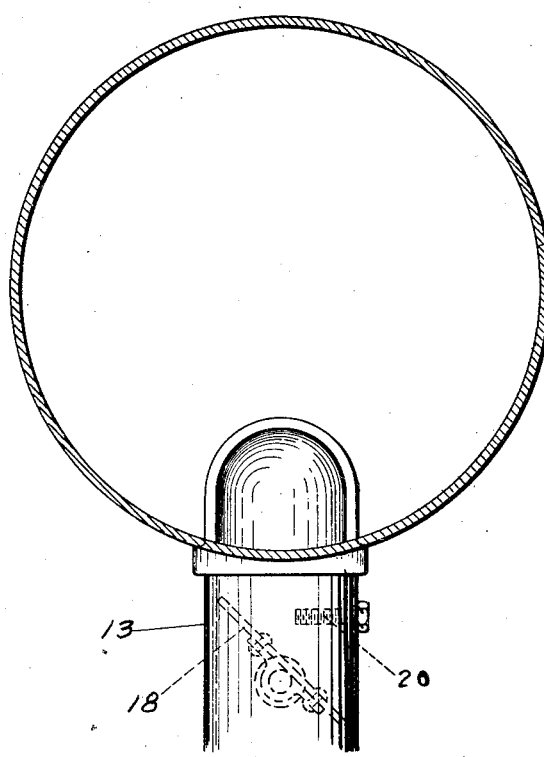
INVENTOR.  
IRA E. McCABE.  
BY *Langdon Moore*  
ATTORNEYS.

Aug. 21, 1928.

I. E. McCABE 1,681,421

THERMAL SAFETY DEVICE

Filed March 29, 1926      7 Sheets-Sheet 4

INVENTOR
IRA E. McCABE.
BY Langdon Moon
ATTORNEYS

Aug. 21, 1928.

I. E. McCABE 1,681,421

THERMAL SAFETY DEVICE

Filed March 29, 1926     7 Sheets-Sheet 5

INVENTOR.
IRA E McCABE.
BY Langdon Moore
ATTORNEYS.

Aug. 21, 1928.

I. E. McCABE 1,681,421

THERMAL SAFETY DEVICE

Filed March 29, 1926     7 Sheets-Sheet 6

INVENTOR.
IRA E. McCABE
BY
ATTORNEYS.

Aug. 21, 1928.

I. E. McCABE 1,681,421

THERMAL SAFETY DEVICE

Filed March 29, 1926

INVENTOR.
IRA E. McCABE
BY Langdon Moore
ATTORNEYS.

Patented Aug. 21, 1928.

1,681,421

UNITED STATES PATENT OFFICE.

IRA E. McCABE, OF CHICAGO, ILLINOIS.

THERMAL SAFETY DEVICE.

Application filed March 29, 1926. Serial No. 98,310.

This invention relates to improvements in electric circuit controls and more particularly to a thermal safety device in an electric circuit employed for operating a domestic fuel heating device.

In all liquid fuel devices employed in heating systems of dwellings or other buildings it is desirable to provide a safety device which will operate upon the extinction of the burner flame, or upon failure of the burner flame to initially ignite, to cut off the supply of the liquid fuel to the burner. The embodiment of the invention illustrated upon the accompanying sheets of drawing is included in an electrically-operated liquid fuel burner of conventional type.

While the preferred forms of this invention are illustrated upon the accompanying sheets of drawing, yet minor detail changes may be made therein without departing from the scope thereof.

In the drawings:

Figure 3 is a view in transverse vertical section taken on the line 3—3 on Figure 2 looking in the direction of the arrows.

Figure 4 is a similar view taken on the line 4—4 of Figure 2.

Figure 1:
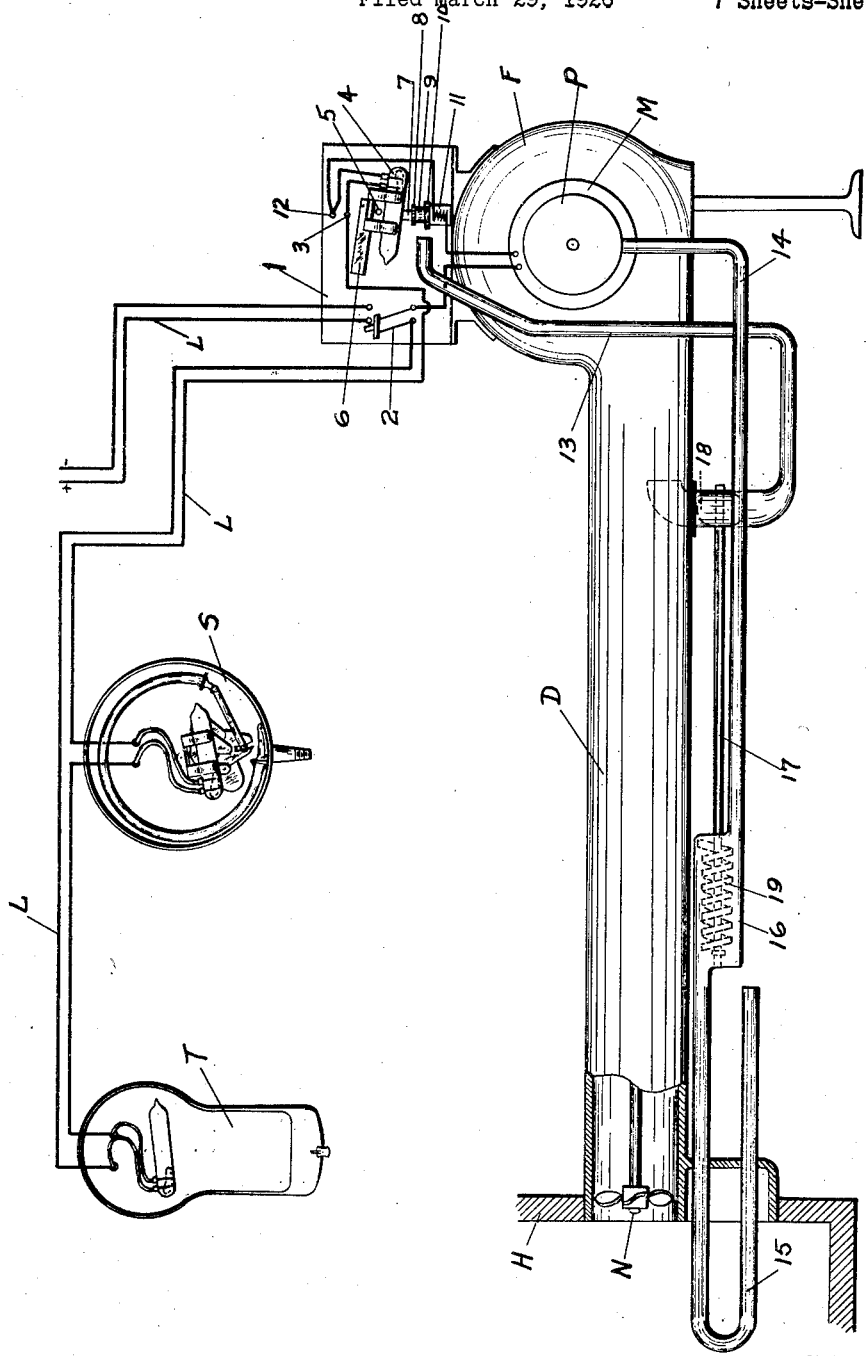
Figure 1 is a view of side elevation of a conventional type of oil burner with parts broken away, partly in section and illustrating the application of this invention together with a wiring diagram illustrating the circuit from the main or commercial line.
Figure 2:
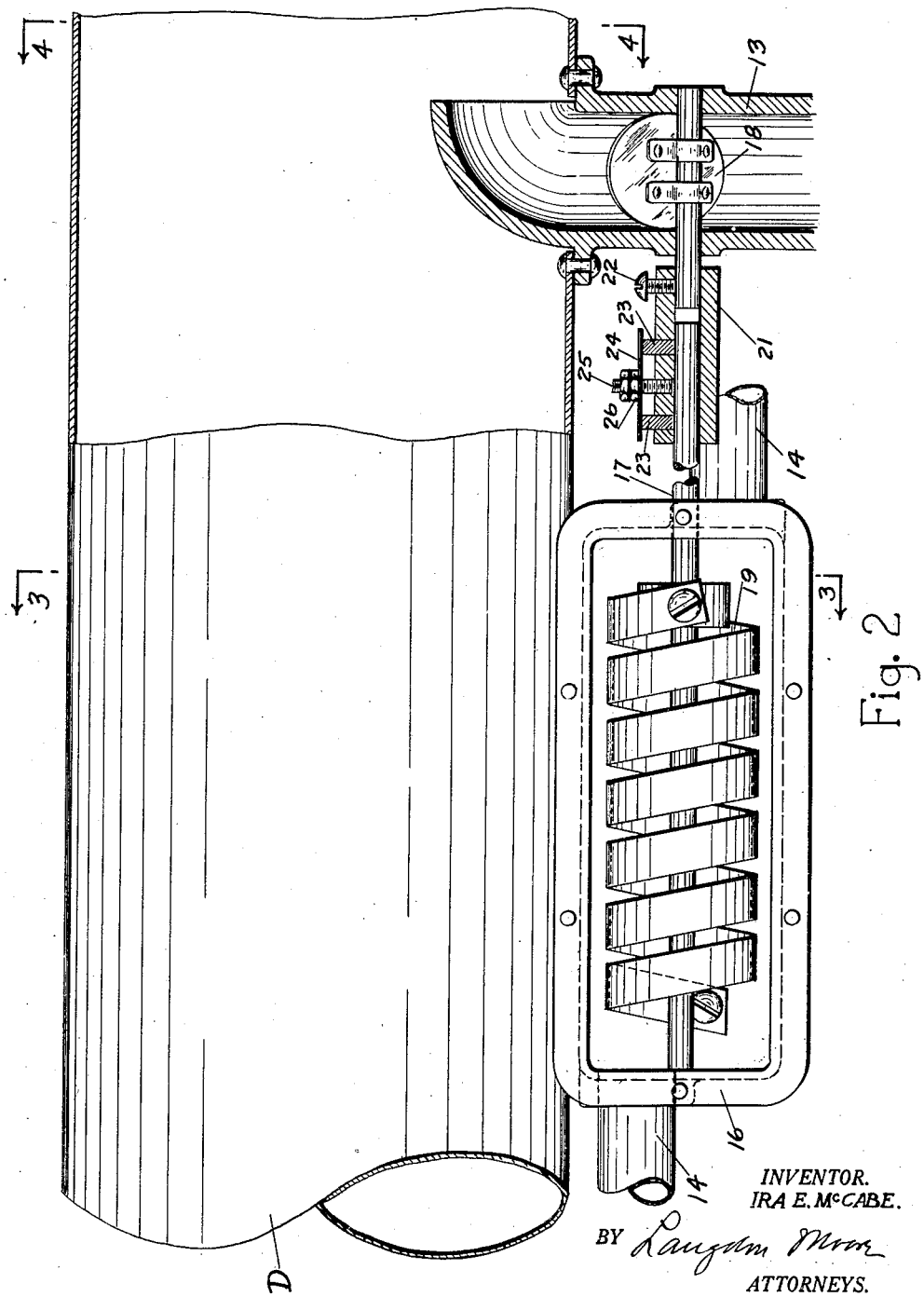
Figure 2 is an enlarged detailed view, partly in section, illustrating the construction and operation of the thermal actuated damper controlling a diversion of air under pressure from the draft pipe of the burner.

Figure 1 illustrates the application of this invention to a conventional type of liquid fuel burner employing oil for generating heat in a furnace or boiler for domestic purposes, and includes a draft pipe D leading from the interior of the furnace or heater H to an air pressure fan F operated by an electric motor M adapted to be placed in the circuit with the commercial current, and, this particular type employs an atomizing pump P which mixes atmospheric air with a supply of oil before it is discharged at the burner nozzle N, all of which construction is now found in a type of commercial burner and needs no further detailed description. In accordance with this invention the electric control and safety device is preferably carried in a casing 1 mounted upon the fan casing of the air blower and includes an ordinary commercial type of switch 2 for closing and opening the circuit to the commercial line. Commercial oil burners for domestic heating purposes are usually controlled by a thermostat placed in the room where it is desired to maintain an even temperature and most of the furnaces or boilers are also provided with a safety device which will break the circuit should the temperature therein or pressure therein become greater than a predetermined degree. The wiring diagram of Figure 1 shows a lead L from the commercial line passing through a room thermostat T, of commercial design and thence to a pressure or temperature safety device S, also of commercial design, and thence back to the casing where the lead is connected to a binding post 3 above a mercury tube switch 4 having two terminals adjacent one end thereof, adapted to be closed by a body of mercury within the tube. This tube is carried upon a plate 5 mounted for rotation about a pivot secured to the back of the casing, which plate is provided with a counterweight 6 normally acting to rotate the plate so that the tube will be inclined to such a position that the mercury will accumulate in the end opposite the terminals, and thereby break the circuit therethrough. The rotatable plate supporting the mercury tube is provided with a depending lug or projection 7 adapted to engage a ratchet wheel 8 in the manner of a pawl and ratchet whereby when the mercury tube switch is tilted at an angle to cause the mercury to close the circuit between the terminals the end of the lug from the supporting plate will engage the ratchet, and if the ratchet is stationary will hold the switch in the closed position. The ratchet wheel 8 is carried upon a rotatable sleeve 9 normally held against rotation by a thin film of solder between the sleeve and an enclosed shaft extending upward from a base 10 which is mounted on the rear of the casing. This base is of heat transmitting metal and is provided with a depending portion about which is wrapped a coil of electric resistance wire 11. This heat coil is connected at one end to one terminal of the motor M, the other terminal of the motor being connected to the other terminal of the control switch 2 of the commercial circuit, and the other end to a binding post 12 arranged on the casing above the binding post 3 to which the commercial lead passing through the room thermostat and safety pressure or temperature control is attached. This latter binding post 3 is connected by a flexible lead to one of the terminals of the mercury tube switch 4 and the other terminal of this switch is connected by a similar flexible lead to the binding post 12 which will place the switch 4 in circuit with the heat coil so that upon closing the commercial circuit, when the electric tube switch is normally held in closed position and the room thermostat closing the circuit, the commercial circuit will pass through the room thermostat, pressure or temperature control, mercury tube switch, heat coil to the motor and back to the commerical line, which will operate the motor, and if continued will transmit sufficient heat to melt the solder to release the ratchet wheel whereby the counter-weight will be free to operate the mercury tube switch to break the circuit.

In order to prevent the operation of the heat coil to melt the solder, the sleeve supporting the ratchet wheel is kept at a temperature below that required to melt the solder by diverting a portion of the air under pressure from the fan to the burner nozzle by providing an air duct or passageway 13 from the air or draft pipe of the burner which will discharge air under pressure upon the ratchet sleeve of sufficient temperature to normally counteract the temperature imparted by the electric heat coil, so that the mercury tube when set to close the circuit will remain in closed position during the operation of the motor.

In order that this supply of cooling air may be controlled by the operation of the burner flame it is contemplated to construct the air inlet 14 to the atomizing pump with a loop 15 therein extending within the interior of the furnace and heater H adjacent to the burner flame so that the air drawn into the atomizing pump first passes through this loop 15 and when the burner flame is operating will be of a temperature considerably higher than that of the atmosphere as it passes out of the furnace or heater to the pump.

In this air pipe a box 16 is interposed which acts as a bearing for a shaft 17 adapted to operate a damper 18 in the air pipe 13 leading to the ratchet sleeve. About this shaft within the box is mounted a bi-metal spiral coil 19 secured at one end to the box and at the other end to the shaft, which at normal atmospheric temperature will maintain the damper in the air pipe to the ratchet sleeve in closed position. This thermal element in the form of a bi-metal spiral, will be quickly affected by the passage of heated air therethrough when the burner flame is operated and will cause a rotation of the shaft to open the damper in said air-pipe. It is preferable to provide a stop 20 in the air pipe to limit the movement of the damper in open position and to compensate for a further movement in either direction being imparted to the shaft by the expansion or contraction of the thermal bi-metal spiral, it is preferable to make the shaft in two parts connected by a sleeve 21 adapted to rotate about said parts with one end rigidly secured thereto as by a set screw 22 with the other end having a frictional contact with the sleeve, such as by spring pressed pins 23 mounted in the sleeve, with a flat spring 24 engaging the exterior ends and held in place by a screw-threaded shaft 25 secured to the sleeve passing through the spring and attached thereto at the outer side by tension adjusting nuts.

The heat generated by the electric coil is so adjusted that it will not melt the solder until a predetermined time has elapsed after the closing of the circuit during which time the burner flame is normally ignited. If the burner flame fails to ignite, then the solder will be melted as the damper in the air pipe is normally closed, and the circuit to the motor will be broken. If the burner flame ignites with the normal operation of the burner mechanism, then the loop of the pipe within the furnace will become heated and the air drawn therethrough to the atomizing pump will be sufficiently increased in temperature to operate the spiral thermal unit to open the damper in the draft pipe and thereafter during the normal operation of the burner, part of the air in the burner air pipe from the fan blower will be diverted through the pipe 13 to the ratchet sleeve and this air of atmospheric temperature and under pressure from the blower fan will pass about the ratchet sleeve and counteract the heat produced in the electric heat coil therebelow so that the solder will remain unmelted, and the mercury tube switch held in the closed position. If, from whatever cause, the burner flame should become extinguished during the operation of the burner mechanism, the loop 15 within the heater will immediately cool so that the air drawn in through the pipe to the atomizing pump will be nearer atmospheric temperature thereby reducing the temperature of the thermal element 19, causing it to operate to close the damper in the air pipe leading to the ratchet sleeve. The cessation of this cooling air about the ratchet sleeve will allow the heat transmitted by the electric heat coil to melt the solder and release the mercury tube switch, whereby the commercial current will be broken to the motor and the burner mechanism will cease to operate.

Figure 5:
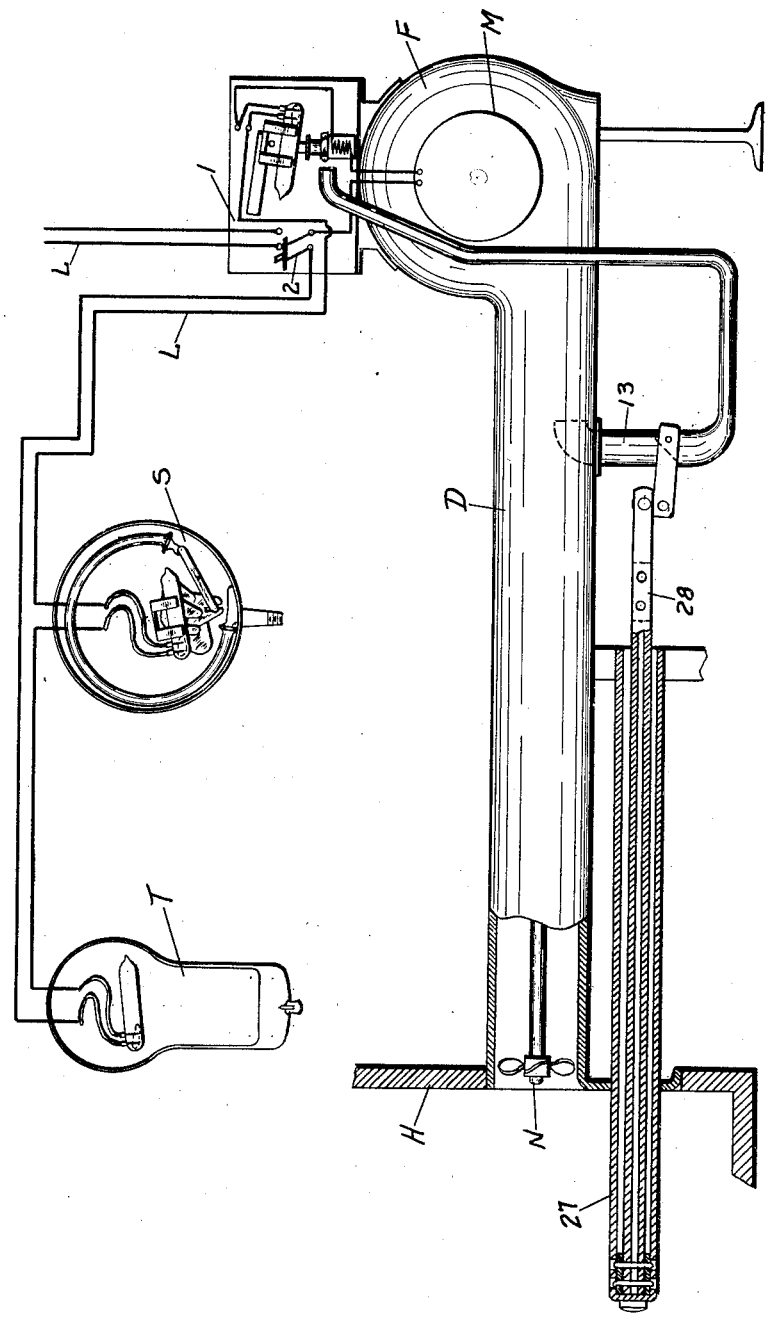
Figure 5 is a view similar to Figure 1 illustrating a modified form of this invention.
Figure 7:
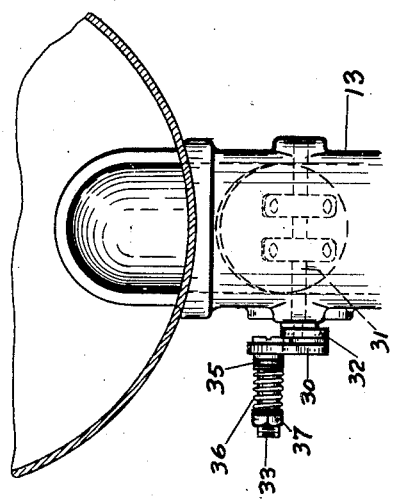
Figure 7 is a view in end elevation of the same.
Figure 8:
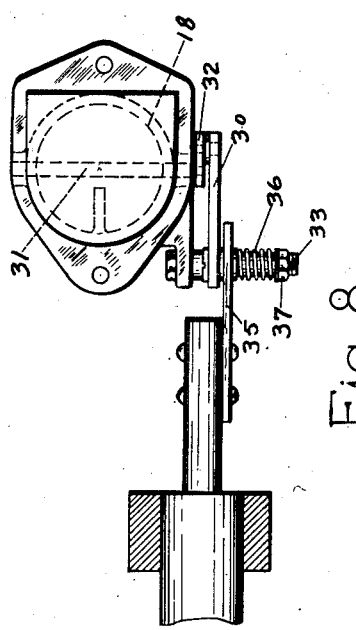
Figure 8 is a top-planned view of this connection with draft pipe removed.
Figure 6:
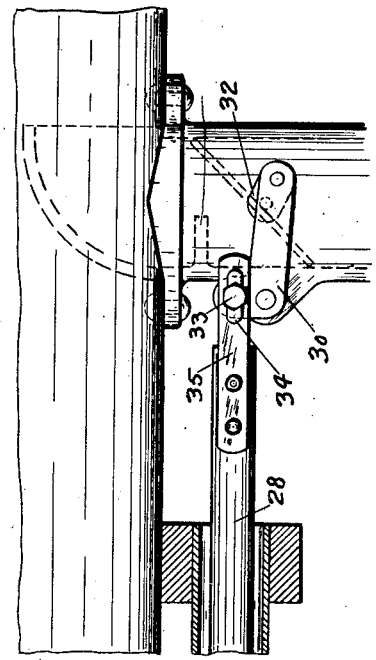
Figure 6 is an enlarged detailed view of the damper operating connection of the type shown in Figure 5.

Figure 5 illustrates a modification which operates upon the same general principle as that just described but the type of commercial burner illustrated omits the atomizing pump and therefore requires a different means for operating the damper in the air pipe leading to the ratchet sleeve. In the form shown in Figure 5 a bi-metal tube is substituted for the spiral thermal element heretofore described. In this case a metal tube 27 of relatively high co-efficient of expansion is secured at one end to the under side of the air pipe D of the burner and extends within the furnace or heater H adjacent a burner flame. The interior end of this tube is rigidly secured to a tube or shaft 28 of relatively less co-efficient of expansion, the exterior end of which tube or shaft is secured to mechanism for opening and closing the damper 18 in the air pipe leading to the ratchet sleeve and which will normally hold the damper in closed position. This mechanism comprises a bell crank lever 30 mounted on a shaft preferably carried upon the air pipe 13 in line with the bearing of the damper shaft 18. The damper shaft 31 is provided with a crank arm 32 which is pivotally secured at its free end to one of the free ends of the bell crank lever. The free end of the other arm of the bell crank lever is provided with a bearing stud 33 adapted to pass through a slot 34 in an extension 35 secured to the free end of the rod 28 and held in frictional engagement therewith by a coil spring 36 interposed between a washer on said stud engaging said extension and a nut 37 screw-threaded on the exterior end of said nut for adjusting the tension of the spring. This frictional engagement between the rod 28 and the damper operating mechanism allows further movement of the rod 28 in the same direction after the damper has engaged its stop and insures immediate operation of the damper in the opposite direction as soon as the rod moves in the opposite direction. Upon ignition of the burner flame, the outer tube will expand more rapidly than the inner tube or shaft and thereby draw the inner tube or shaft toward the furnace end which movement is employed to open the damper in the air pipe leading to the ratchet sleeve. By this construction the same result is obtained as heretofore described in regard to construction illustrated in Figure 1.

In the form illustrated in Figures 9 to 14 inclusive the same type of oil burner is illustrated operated and controlled in the same general way as that described in relation to Figure 1, and in which like reference characters refer to like parts.

Figure 9:
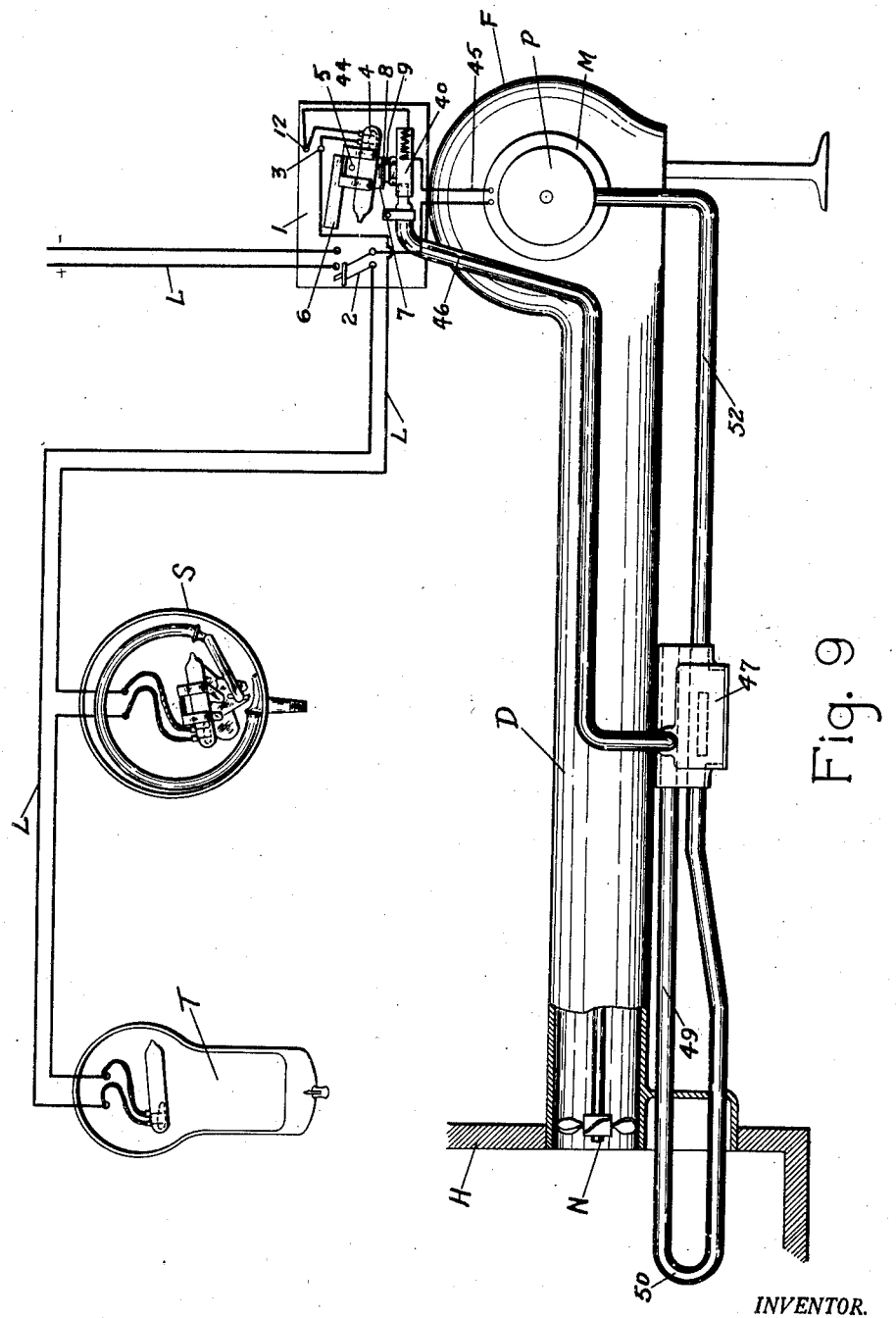
Figure 9 is a view similar to Figure 1 illustrating another form of application of this invention.
Figure 10:
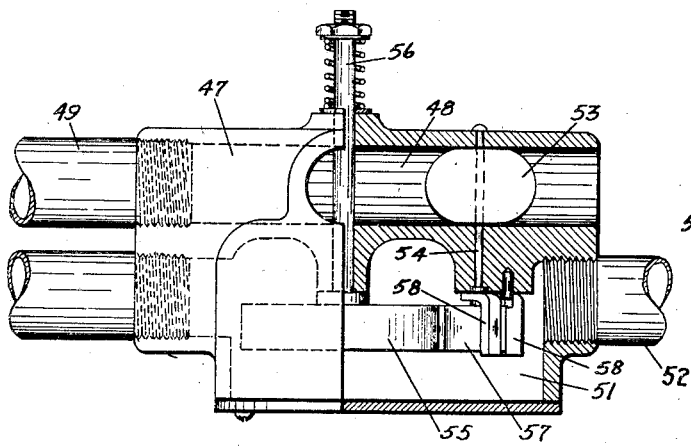
Figure 10 is an enlarged detailed view with parts broken away and partly in section of the casing containing the damper operating mechanism.
Figure 11:
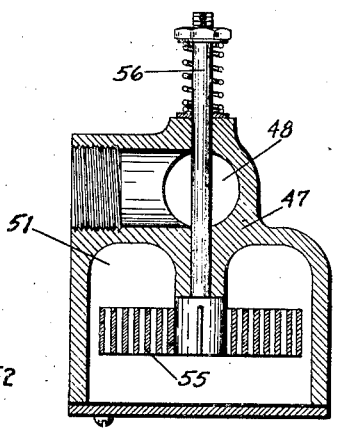
Figure 11 is a view in vertical transverse section of Figure 10.
Figure 12:
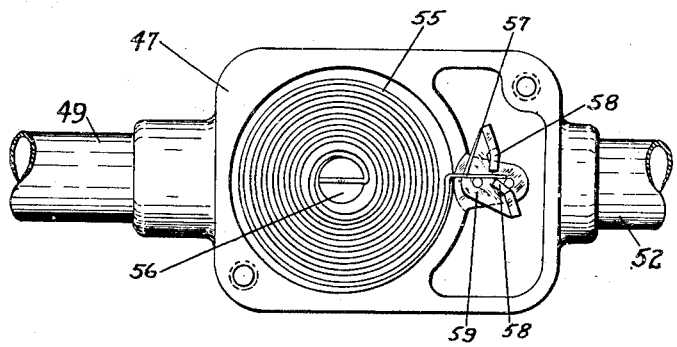
Figure 12 is a bottom planned view of Figure 10 with the bottom closure plate removed.
Figure 13:
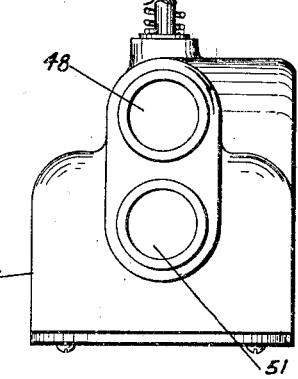
Figure 13 is a view in end elevation of Figure 10.
Figure 14:
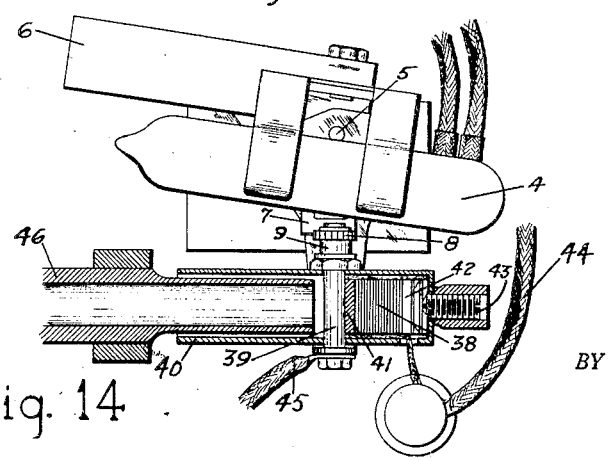
Figure 14 is an enlarged detailed view partly in section of the heat generating element in the motor circuit employed in this form of device.

In the first form illustrated a current of air under pressure from the fan was diverted from the draft pipe to cool the electric heat generating element controlling the safety switch while in the form illustrated in Figure 9 the operation of the fan draws air away from and thereby reduces the temperature of the electric heat generating element controlling the operation of the safety switch. In this type as illustrated in Figure 14 the electric heat generating element is illustrated as comprising a plurality of super-imposed graphite disks 38 in contact with the depending portion 39 of the base which mounts the shaft and sleeve 9 of the ratchet wheel 8 and as illustrated comprises a metallic tube 40 through which the depending portion passes diametrically. One end of the tube is provided with a closure. A plurality of graphite disks are arranged one against the other between two end plates 41 and 42 and are insulated from the tubular member by a sleeve of mica or other insulating material. One end plate 41 bears against the depending portion 39 of the ratchet supporting base and the other end plate 42 is adjustably mounted and adapted to increase or decrease pressure thereby to the series of superimposed disks by a threaded shaft 43 engaging the closure and the adjacent end plate. A lead 44 from one terminal of the mercury tube switch is connected through binding post 12 to the adjustable end plate 42 and a lead 45 from one pole of the motor is connected to the exterior portion of the depending member to close the circuit. The amount of heat generated by the series of super-imposed graphite disks when the current passes therethrough is regulated by the amount of compression placed upon the disks.

In this form of the invention a suction tube 46 leads from the interior of the tube 40 adjacent the depending member 39 to a thermally-operated damper mechanism box 47, preferably arranged on the under side of the draft pipe. This section pipe enters at the side of the box 47 and is in communication with a longitudinal passageway 48 therethrough, one end of which is open to the atmosphere and the other end is connected to a pipe 49 extending in the form of a loop 50 beyond the draft pipe, into the fire box of the burner adjacent the nozzle N returning to the thermally-operated mechanism box and communicating with a longitudinal passageway 51 passing therethrough parallel and below the first passageway 48, the opposite end of which is connected by a similar pipe 52 to the intake of the atomizing pump P or to the intake of the fan blower F as the case may be. The upper longitudinal passageway into which the suction pipe from the safety switch opens is provided with a damper 53 between the end opened to the atmosphere and the port into which this pipe leads. This damper is mounted upon a vertical shaft 54 which extends downward through the casing and into the longitudinal passageway 51 therebelow. This lower passageway is provided with a bi-metallic thermal coil 55 secured at one end to a shaft 56 passing upward through the casing and having its free end 57 bent at right angles adapted to engage between the opposite fingers 58 of a bent plate 59 carried on the lower end of the damper shaft, which coil is so adjusted by the rotation of the coil shaft 56, which shaft is provided with a frictional clutch as illustrated, that under the normal condition when the blower is not operated the damper will open the passageway to the atmospheric air. When the operation of the burner is started the blower will draw air through the atmospheric port in passageway 48, through the loop, 50 subjected to the heat of the burner flame, back through the box 47, about the thermal coil 55 therein, and from there to the intake of the pump or fan, as the burner flame is ignited the heat generated thereby will heat the loop adjacent thereto so that the air passing through the loop will be raised in temperature and as this heated air passes about the thermal coil it will cause the coil to expand thereby rotating the damper shaft to close this admission of atmospheric air and further operation of the atomizing pump or fan blower will cause air to be drawn through the suction pipe 46 from the electric heat generating element of the safety switch which in turn passes through the heated loop back to the intake side of the pump or blower thereby maintaining the damper in closed position as long as the burner flame operates. The suction from the end of the pipe 46 draws atmospheric air in through the tube 40 carried on the depending member 39 of the safety switch control and reduces the temperature thereof sufficiently to prevent the solder holding the ratchet wheel from melting. Should for any reason whatever the burner flame be extinguished, the air passing through the loop will immediately decrease in temperature which as it passes about the thermal coil will allow the same to contract thereby causing the damper to be rotated to open the port leading to the atmospheric air and thereafter the fan blower will draw the air through this port and discontinue its action upon the suction tube whereby the full temperature of the heat generating element in the safety switch will be immediately transmitted through the depending member to melt the solder and release the ratchet of the safety mechanism, which in turn breaks the circuit to the motor.

From the description of the embodiment of this invention above set forth it is seen that this invention provides a very simple safety device which employs only the commercial circuit in the actuation of the safety device and for the operation of the motor of the burner mechanism. It also employs temperature actuated means for operating the safety device to break the circuit if the burner flame initially fails to ignite or, if after ignition, fails for any reason. It also employs the commercial circuit to normally actuate the safety device to break the circuit to the motor and it employs the heat generated by the burner flame to actuate the thermal element to counteract the heat generated by the commercial circuit to maintain the safety device in closed position during normal operation.

It is obvious that either form of heat generating element may be employed without departing from the scope of this invention and this system of control may be employed with an oil burning system which omits the atomizing pump by causing the diversion of the atmospheric air for operating the thermal damper control to lead to the intake side of the fan blower.

What I claim is:

1. A thermal safety device for electrically-operated liquid fuel burner mechanisms, comprising a switch in the motor circuit normally operable to open said circuit, means adapted to hold the switch in closed position, a heat generating element in the motor circuit adapted to release said switch holding means, and means for passing a current of air adjacent said heat generating element to reduce the temperature thereof below the switch releasing degree, said means controlled by the activity of the burner flame.

2. A thermal safety device for electrically-operated liquid fuel burner mechanisms, comprising a switch in the motor circuit normally operable to open said circuit, means adapted to hold the switch in closed position, a heat generating element in the motor circuit adapted to release said switch holding means, and means for passing a current of air adjacent said heat generating element to reduce the temperature thereof below the switch releasing degree, including means for diverting a portion of air employed under pressure in the draft pipe, said means controlled by the activity of the burner flame.

3. A thermal safety device for electrically-operated liquid fuel burner mechanisms, including a draft pipe leading air under pressure to the burner nozzle, comprising a switch in the motor circuit normally operable to open said circuit, means adapted to hold the switch in closed position, a heat generating element in the motor circuit adapted to release said switch holding means, and means for passing a cooling stream of air adjacent said heat generating element to reduce the temperature thereof below the switch releasing degree, including means for diverting a portion of air employed under pressure in the draft pipe during the operation of the motor, said means controlled by the activity of the burner flame.

4. A thermal safety device for electrically-operated fuel burner mechanisms including a draft pipe leading air under pressure to the burner nozzle, comprising a switch in the motor circuit normally operable to open said circuit, means adapted to hold the switch in closed position, a heat generating element in the motor circuit adapted to release said holding means, means for diverting a portion of air employed under pressure in the draft pipe to pass adjacent said heat generating element to reduce the temperature thereof below the switch releasing degree, a damper in said diverting conduit and means actuated by activity of the burner flame to operate said damper.

5. A thermal safety device for electrically-operated fuel burner mechanisms including a draft pipe leading air under pressure to the burner nozzle, comprising a switch in the motor circuit normally operable to open said circuit, means adapted to hold the switch in closed position, a heat generating element in the motor circuit adapted to release said holding means, means for diverting a portion of air employed under pressure in the draft pipe to pass adjacent said heat generating element to reduce the temperature thereof below the switch releasing degree, a damper in said diverting conduit, and means actuated by the activity of the burner flame to operate said damper, said means including a thermal element adjacent the burner flame.

6. A thermal safety device for electrically operated fuel burner mechanisms, including a draft pipe leading air under pressure to the burner nozzle, in combination with an electric switch in the motor circuit having a heat controlled element, said control element being in said circuit and affected thereby to release the switch to break the circuit, means for diverting air employed under pressure in the draft pipe during the operation of the motor to counter-effect the switch heat control to maintain the switch in closed position and means actuated by the ignition of the burner flame to control the diversion of such air.

7. A thermal safety device for electrically operated fuel burner mechanisms including a draft pipe leading air under pressure to the burner nozzle, in combination with a heat controlled electric switch in the motor circuit having an element of the control in the motor circuit adapted to release said switch to break the circuit, means for diverting air employed under pressure in the draft pipe adjacent said heat element said air adapted to reduce the temperature of said heat element to maintain the switch in closed position and means actuated by the heat produced by the burner flame to control the diversion of such air.

8. A thermal safety device for electrically-operated liquid fuel burner mechanisms including an electric motor, a fan blower, a draft pipe leading air under pressure therefrom to the burner nozzle, and an atomizing pump, in combination with a switch in the motor circuit normally operable to open said circuit, means adapted to hold the switch in closed position, a heat generating element in the motor circuit adapted to normally release said holding means, means for diverting a current of air employed under pressure in the draft pipe adjacent said heat generating element to reduce the temperature thereof below the switch releasing degree, means controlling the diverting of such air, an air inlet conduit for the atomizing pump having a loop therein passing adjacent the burner nozzle before entering the atomizing pump, and a thermal element in said conduit adapted to operate said air diverting control.

IRA E. McCABE.